United States Patent
Wang et al.

(10) Patent No.: US 6,712,569 B1
(45) Date of Patent: Mar. 30, 2004

(54) ROPE TIE

(76) Inventors: Ming-Fang Wang, No. 40-10, Chung-Hsan, Road, Sec. 1, Kuei-Jen Hsiang, Tainan Hsien (TW); Yin-Shu Yang, No. 10, Taitsu 5 Street, Taitsu Viliage, Len-Der Hsiang, Tainan Hsien (TW)

( * ) Notice: Subject to any disclaimer, the term of this patent is extended or adjusted under 35 U.S.C. 154(b) by 0 days.

(21) Appl. No.: 10/383,517

(22) Filed: Mar. 10, 2003

(51) Int. Cl.[7] .............................................. B61D 45/00
(52) U.S. Cl. ...................................... 410/111; 410/107
(58) Field of Search ................................ 410/107, 101, 410/106, 110, 111, 116; 24/265 CD, 115 K; 248/499

(56) References Cited

U.S. PATENT DOCUMENTS

| | | | | |
|---|---|---|---|---|
| 4,297,963 A | * | 11/1981 | Beacom ................. | 114/230.29 |
| 4,493,136 A | * | 1/1985 | Groutage et al. ........ | 24/573.09 |
| 4,925,226 A | * | 5/1990 | Leonard et al. ............ | 294/82.1 |
| 5,004,388 A | * | 4/1991 | Harris ........................ | 410/107 |
| 5,106,248 A | * | 4/1992 | Harris ........................ | 410/107 |
| 5,444,897 A | * | 8/1995 | Gross .................... | 24/265 CD |

FOREIGN PATENT DOCUMENTS

| | | | | |
|---|---|---|---|---|
| DE | 3528430 | * | 2/1987 | ................. 410/101 |
| EP | 42563 | * | 12/1981 | ................. 410/101 |

* cited by examiner

Primary Examiner—D. Glenn Dayoan
Assistant Examiner—H. Gutman
(74) Attorney, Agent, or Firm—Bacon & Thomas, PLLC

(57) ABSTRACT

A rope tie has a cylindrical housing contiguous to a base, with a first bore, a second bore, and a shoulder section contained in the housing and a first groove and a second groove inset along the second bore. A post is movably disposed in the base and consists of a first columnar section, a second columnar section, and a second shoulder section. A spring is seated between the second shoulder section and the first shoulder section, a check section is situated at one extremity of the post, and a hitch hole is formed through the first columnar section. As such, the check section is capable of engaging the first groove or the second groove, thereby enabling the re-positioning of the post.

12 Claims, 3 Drawing Sheets

ROPE TIE

BACKGROUND OF THE INVENTION

1) Field of the Invention

The invention relates to a rope tie of simple construction utilizing fewer components and thus involving lower molding costs in an arrangement that features a rope securing post capable of extension and retraction which provides for positive and stable positioning.

2) Dsecription of the Related Art

When delivery vehicles transport cargo, ropes are normally utilized to lash down cargo onto the vehicle, with the ropes secured by means of ties fastened to the vehicle. Such ties are typically hook-type fixtures installed around the freight bed and loading gates, wherein the ropes are wrapped around the said fixtures a number of times to keep cargo stationary.

The inventor Halford S. Harris introduced a Retractable Cleat Device under U.S. Pat. No. 5,004,388. The said invention provides a housing, the housing having a cleat loaded by a spring, with an opening formed in the cleat for securing rope. The upward extension and downward retraction of the cleat derives from a rotatably mounted star-shaped body pawl at the side of the cleat, wherein the said star-shaped pawl tracks up and down in a slot and after the star-shaped pawl contacts two posts at the upper extent of the slot, the star-shaped pawl rotates and changes direction, with the star-shaped pawl changing direction and rotating each time the cleat ascends and descends, the differing situations of contact and rotation providing for the movement of the cleat up to a high position and back down to a low position. However, this kind of extension and retraction to achieve repositioning is not ideal because of the excessive points of contact involved to achieve rotation, an arrangement requiring a design of considerable difficulty that facilitates effective control over contact point timing and dimensions and, furthermore, which entails an overly complex structure and rather high molding costs; such a product has never been observed on the market.

Following U.S. Pat. No. 5,004,388 Halford S. Harris filed a further iteration of the said Retractable Cleat Device under U.S. Pat. No. 5,106,248. In the above continuance, the means of positional extension and retraction was modified into a cylindrical cam having a curvilinear groove along its exterior surface and cam followers mounted in the side walls of the housing that project into the cam groove, with the arrangement achieving positional upward extension and downward retraction by the application and release of pressure in an approach resembling that of a conventional mechanical pencil. While such a means is understandable, the structural design of the said cam is similarly complex, high in molding cost, and impractical.

SUMMARY OF THE INVENTION

The objective of the invention herein is to provide an improved rope tie comprised of a base consisting of a cylindrical housing and a mounting plate, a first bore and a second bore fabricated in the housing with a first shoulder section formed at their confluence and a second groove having a second locating point and, furthermore, a post movably disposed in the base consisting of a first columnar section and a second columnar section with a second shoulder section formed at their confluence, a spring seated between the second shoulder section and the said first shoulder section, a check section at one extremity of the post, and a hitch hole formed through the first columnar section such that the check section engages the first groove or the second groove to thereby enable the re-positioning of the post.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE INVENTION

Figure 1:
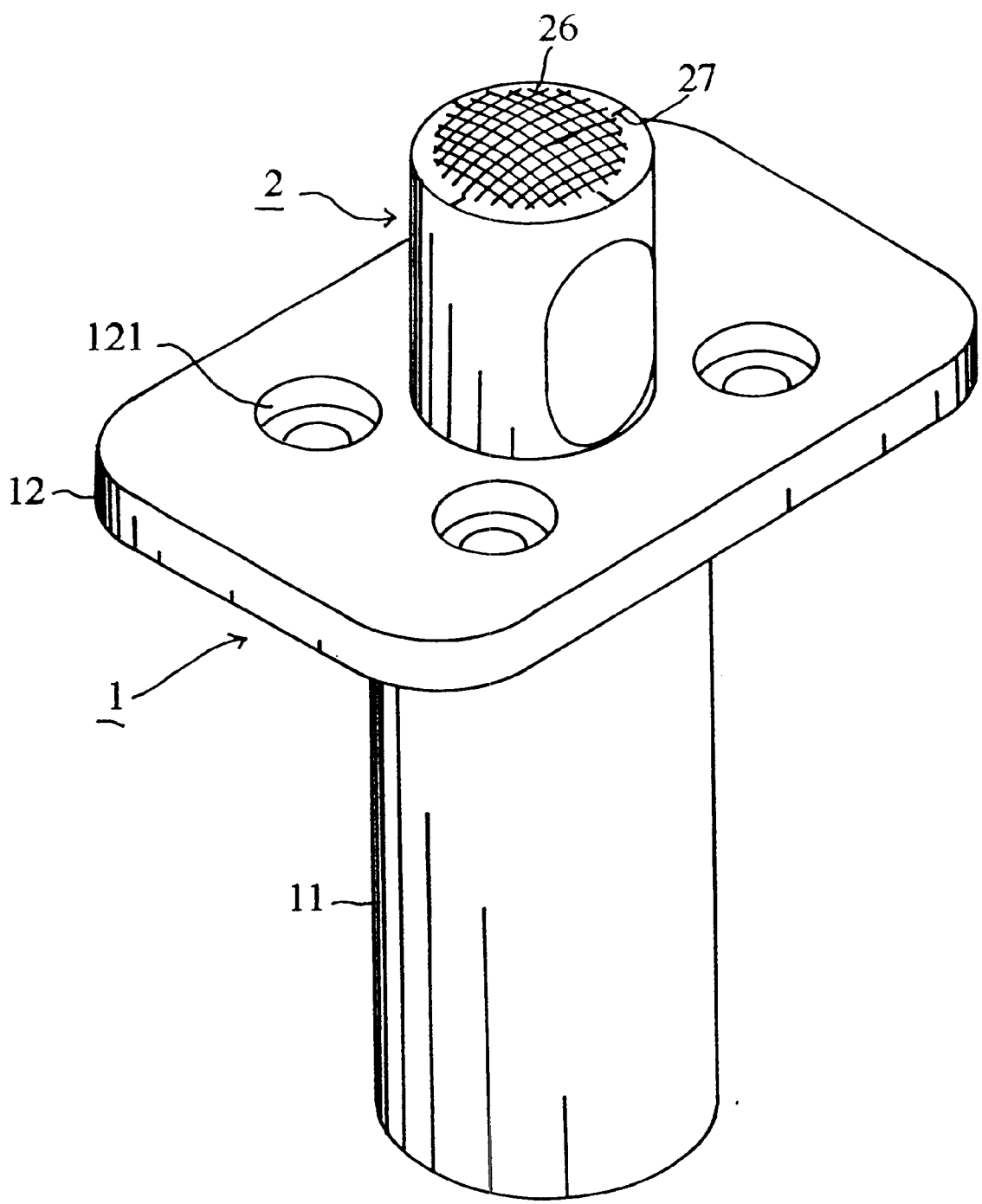
FIG. 1 is an isometric drawing of the invention herein.

In the detailed description of the preferred embodiments, it should be noted that similar elements are indicated by the same reference numerals throughout the disclosure.

Figure 2:
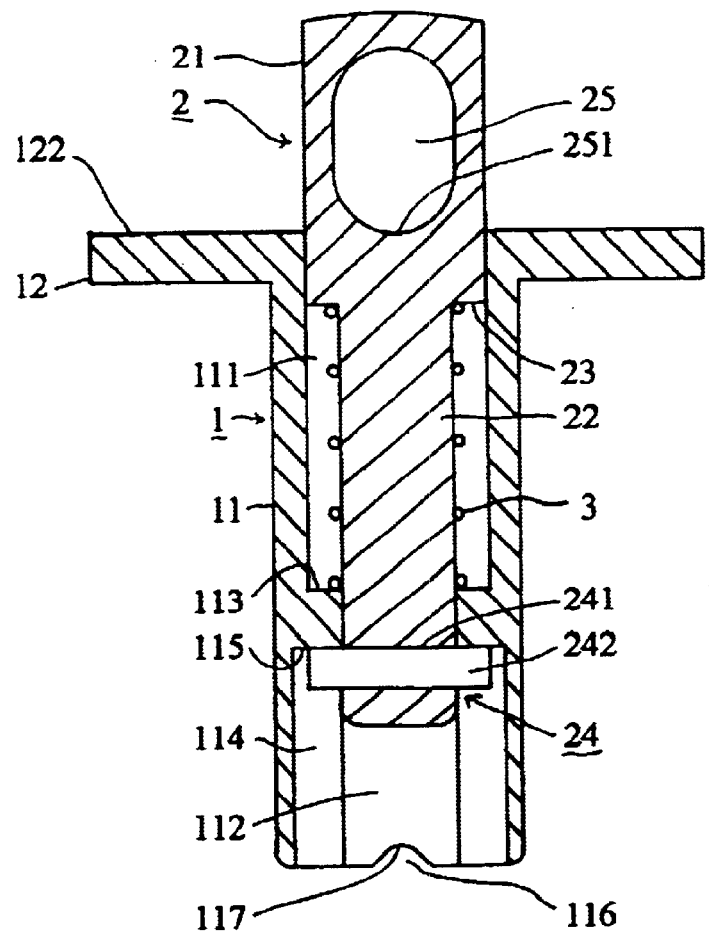
FIG. 2 is a cross-sectional drawing of the invention herein when the post is extended.
Figure 3:
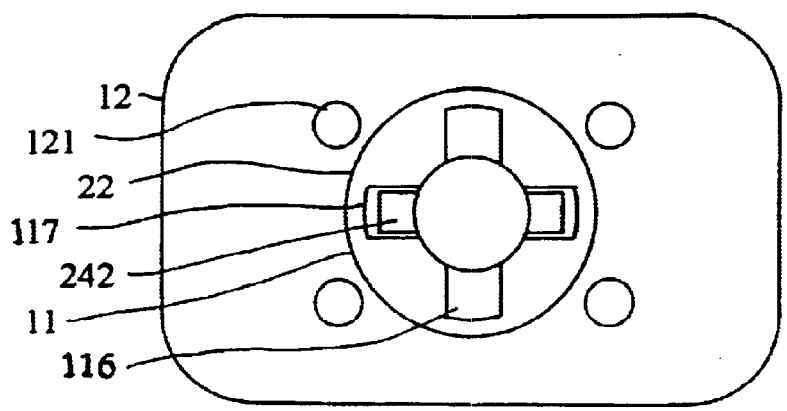
FIG. 3 is an orthographic drawing of FIG. 2, as viewed from the top.

Referring to FIG. 1, FIG. 2, and FIG. 3, the preferred embodiment of the invention here is comprised of:

A base 1 consisting of a cylindrical housing 11 and a mounting plate 12 disposed at the upper extent of the housing 11, with a plurality of through-holes 121 in the mounting plate 12 that enables the entry of screws for installing the base 1 onto the door panel of a conventional cargo vehicle after the housing 11 is inserted into an opening made in the said door panel; a first bore 111 of a larger diameter and a second bore 112 of a smaller diameter disposed in the base housing 11; a first shoulder section 113 formed at the bottom portion of the larger diameter first bore 111 due to the confluence of the differing diameters of the first bore 111 and the second bore 112; a first groove 114 inset vertically along each of the two facing exterior sides of the second bore 112; a first locating point 115 disposed at the upper end surfaces of the first groove 114; a second groove 116 inset horizontally across the bottom side of the second bore 112; and a second locating point 117 disposed at the upper end surfaces of the second groove 116, wherein the first groove 114 and the second groove 116 are situated approximately 90 degrees apart.

A post 2 movably disposed in the base 1 consisting of a first machined diameter, first columnar section 21 and a second machined diameter, second columnar section 22, wherein the first machined diameter is larger than the second machined diameter such that the said second bore 112 of the said base housing 11 only accommodates the insertion of the second columnar section 22; a second shoulder section 23 formed at the bottom portion of the larger machined diameter, first columnar section 21 due to the confluence of the differing diameters of the first columnar section 21 and the second columnar section 22; a spring 3 seated between the second shoulder section 23 of the post 2 and the first shoulder section 113 at the bottom portion of the first bore 111 in the said base housing 11; a check section 24 near the lower extremity of the post 2 consisting of a passage 241 through the diameter of the post 2 and a rolled elastic pin 242 situated in the passage 241 and, furthermore, the check section pin 242 fits into the first groove 114 and the second groove 116 of the said base housing 11; a hitch hole 25 formed diametrically through the first columnar section 21; and a coarse crosshatched touch tip section 26 patterned over the center, top end surface of the first columnar section 21, with the said touch tip section 26 also having graduations 27 incised at intervals of approximately 90 degrees along its circumference.

Referring to FIG. 2, when the pin 242 of the post check section 24 is postured against the first locating point 115 of the first groove 114, part of the post 2 first columnar section 21 protrudes beyond the base mounting plate 12 and, furthermore, the bottom edge 251 of the hitch hole 25 is slightly higher than the upper surface 122 of the mounting plate 12 to provide for threading rope through the hitch hole 25 to lash cargo.

Figure 4:
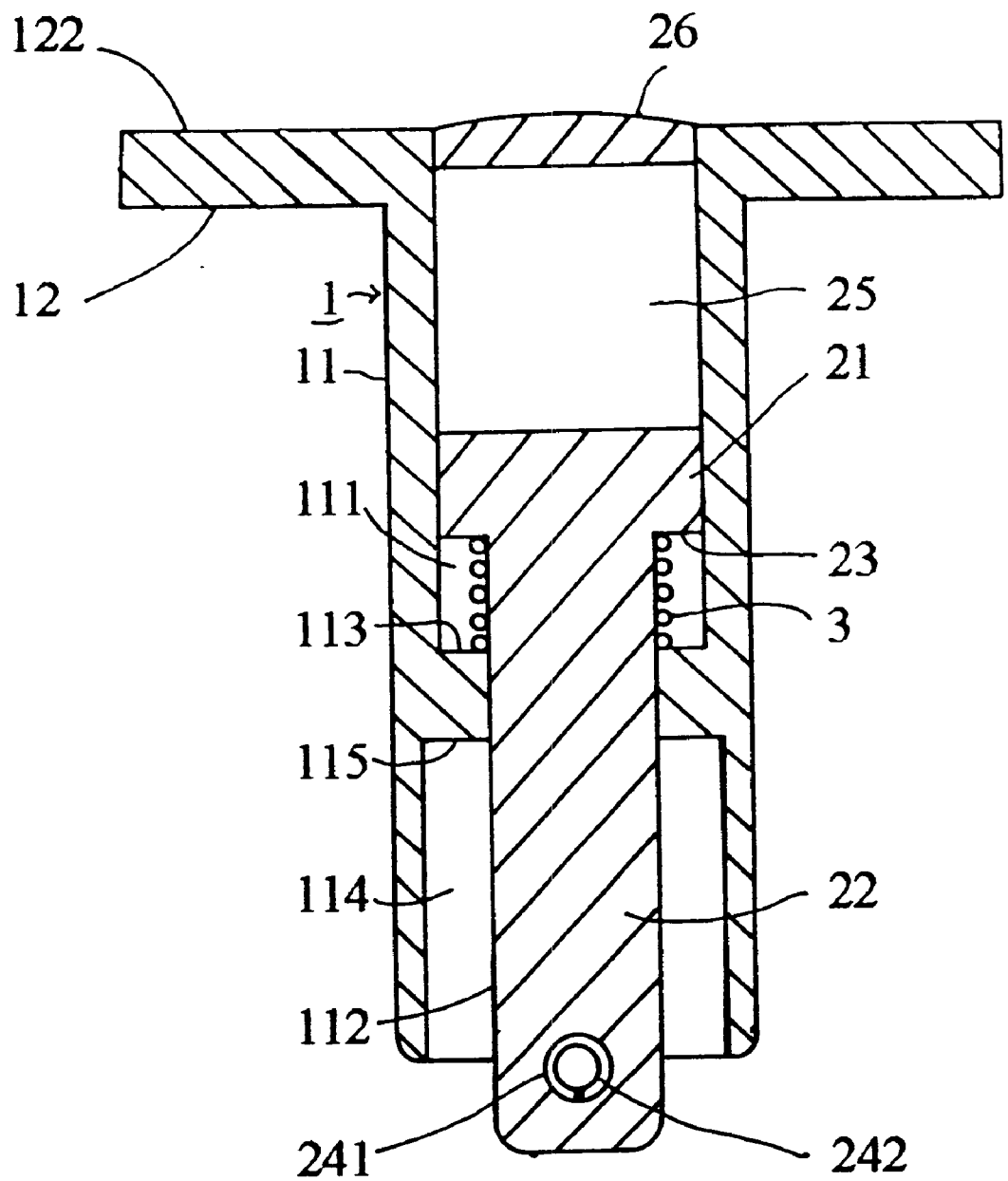
FIG. 4 is a cross-sectional drawing of the invention herein when the post is retracted.

Referring to FIG. 4, when the post 2 hitch hole 25 is not utilized, the touch tip section 26 of the post 2 is pressed down by thumb, thereby compressing the spring 3 seated between the second shoulder section 23 of the post 2 and the first shoulder section 113 of the first bore 111 in the said base housing 11, while the second columnar section 22 moves through the second bore 112 of the base housing 11, shifting the pin 24 of the check section 24 at the lower extremity of the post 2 out of the first groove 114 and causing the rotation of the thumb pressing the touch tip section 26 due to friction from the coarse, crosshatched touch tip section 26 as the post 2 rotates an angle of approximately 90 degrees, which is indicated during rotation by referencing the gradations 27 along the circumference of the touch tip section, at which time the pin 242 revolves into alignment with the second groove 116 of the base housing 11, and following the release of force applied by the thumb, the pin 242 becomes nested on the second locating point 117 of the said second groove 116, whereupon the upper extent of the post 2 is positioned evenly with the upper surface 122 of the base mounting plate 12.

Since the structure of invention herein is simple and the structural components are uncomplicated and few in quantity, molding costs are low and, furthermore, the rope securing post 2 respectively engages the first and the second groove 114 and 116 when extended and retracted to thereby achieve positive and stable positioning.

While the present invention has been described in relation to what is considered the most practical and preferred embodiment, the invention herein is not limited to the disclosed embodiment, with the detailed description intended to cover the various arrangements included within the spirit and scope of the broadest interpretation and equivalent arrangements.

What is claimed is:

1. A rope tie comprised of:

a base consisting of a cylindrical housing and a mounting plate; a first bore and a second bore disposed in the housing; a first shoulder section formed at the confluence of the first bore and the second bore; and a first groove having a first locating point as well as a second groove having a second locating point formed in the second bore;

a post movably disposed in the base consisting of a first machined diameter, first columnar section and a second machined diameter, second columnar section; a second shoulder section formed at the confluence of the first columnar section and the second columnar section; a spring seated between the second shoulder section and the first shoulder section in the base; a check section at one extremity of the post; and a hitch hole formed through the first columnar section;

wherein the rope tie enables the application of force to the post and subsequent travel to toggle engagement of the post between the first locating point of the first groove and the second locating point of the second groove such that the first columnar section of the post extends outside the base or retracts into the base.

2. As mentioned in claim 1 of the rope tie invention herein, the first bore in the base housing is of a larger diameter than the second bore.

3. As mentioned in claim 1 of the rope tie invention herein, the first groove is inset vertically along each of two facing exterior sides of the second bore.

4. As mentioned in claim 1 of the rope tie invention herein, the first locating point is formed at the upper end surface of the first groove.

5. As mentioned in claim 1 of the rope tie invention herein, the second groove is disposed horizontally across the bottom surface of the second bore.

6. As mentioned in claim 1 of the rope tie invention herein, the said second locating point of the second groove is formed on upper end surfaces of the second groove.

7. As mentioned in claim 1 of the rope tie invention herein, the first groove and the second groove are approximately 90 degrees apart.

8. As mentioned in claim 1 of the rope tie invention herein, the check section consists of a passage through the diameter of the post and a rolled elastic pin situated in the passage.

9. As mentioned in claim 1 of the rope tie invention herein, the first columnar section of the said post is of a larger machined diameter than the second columnar section.

10. As mentioned in claim 1 of the rope tie invention herein, the housing of the said base accommodates the insertion of the second columnar section.

11. As mentioned in claim 1 of the rope tie invention herein, the first columnar section of the post has a coarse, crosshatched touch tip section patterned at its top.

12. As mentioned in claim 1 of the rope tie invention herein, the first columnar section of the post has graduations incised at intervals of approximately 90 degrees along its upper end surface.

* * * * *